US012688663B2

(12) United States Patent
Olivier et al.

(10) Patent No.: US 12,688,663 B2
(45) Date of Patent: Jul. 21, 2026

(54) METHOD AND AN APPARATUS FOR GENERATING A 3D FACE COMPRISING AT LEAST ONE DEFORMED REGION

(71) Applicant: InterDigital CE Patent Holdings, SAS, Paris (FR)

(72) Inventors: Nicolas Olivier, Chateaubourg (FR); Fabien Danieau, Rennes (FR); Quentin Avril, Betton (FR); Philippe Guillotel, Vern sur Seiche (FR); Ferran Argelaguet Sanz, La Chapelle des Fougeretz (FR); Anatole Lecuyer, Rennes (FR); Franck Multon, Pleumeleuc (FR); Ludovic Hoyet, Noyal sur Vilaine (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 138 days.

(21) Appl. No.: 18/562,204

(22) PCT Filed: May 16, 2022

(86) PCT No.: PCT/EP2022/063202
§ 371 (c)(1),
(2) Date: Nov. 17, 2023

(87) PCT Pub. No.: WO2022/243250
PCT Pub. Date: Nov. 24, 2022

(65) Prior Publication Data
US 2024/0249489 A1      Jul. 25, 2024

(30) Foreign Application Priority Data

May 18, 2021     (EP) ..................................... 21305647

(51) Int. Cl.
*G06T 19/00* (2011.01)
*G06T 19/20* (2011.01)
(Continued)

(52) U.S. Cl.
CPC ............ *G06T 19/20* (2013.01); *G06V 10/764* (2022.01); *G06V 10/82* (2022.01); *G06T 2219/2021* (2013.01); *G06T 2219/2024* (2013.01)

(58) Field of Classification Search
None
See application file for complete search history.

(56) References Cited

U.S. PATENT DOCUMENTS

| 11,436,865 B1 * | 9/2022 | Motiian | ............... | G06V 30/194 |
| 11,508,148 B2 * | 11/2022 | Li | ......................... | G06F 18/217 |

(Continued)

FOREIGN PATENT DOCUMENTS

| CN | 112837210 A | 5/2021 |
| WO | WO 2019098872 A1 | 5/2019 |

(Continued)

OTHER PUBLICATIONS

Zhou et al., "3D cartoon face generation by local deformation mapping", International Journal of Computer Graphics, The Visual Computer, vol. 32, Jun. 10, 2016, 11 pages.
(Continued)

*Primary Examiner* — Martin Mushambo
(74) *Attorney, Agent, or Firm* — Condo Roccia Koptiw LLP

(57) ABSTRACT

A method and an apparatus for generating a 3D face comprising at least one region deformed according to a deformation style are provided. 3D data representative of at least
(Continued)

one region of a first 3D face is provided as input to a neural network-based geometry deformation generator. Data representative of the deformation style is provided as input to the neural network-based geometry deformation generator. The 3D face comprising the at least one deformed region is obtained from the neural network-based geometry deformation generator, wherein the at least one deformed region includes geometry deformations representative of the deformation style.

20 Claims, 5 Drawing Sheets

(51) Int. Cl.
G06V 10/764 (2022.01)
G06V 10/82 (2022.01)

(56) References Cited

U.S. PATENT DOCUMENTS

| | | | | |
|---|---|---|---|---|
| 11,688,100 | B1 * | 6/2023 | Sun | H04N 23/45 |
| | | | | 382/156 |
| 2018/0033181 | A1 | 2/2018 | Sela et al. | |
| 2019/0272668 | A1 * | 9/2019 | Echevarria Vallespi | |
| | | | | G06T 15/503 |
| 2021/0125390 | A1 | 4/2021 | Cotter et al. | |
| 2021/0319532 | A1 * | 10/2021 | Gong | G06T 7/0002 |
| 2022/0044352 | A1 * | 2/2022 | Liao | G06F 18/2135 |
| 2022/0374625 | A1 * | 11/2022 | Chu | G06N 20/10 |
| 2023/0334805 | A1 * | 10/2023 | Danieau | G06T 15/02 |
| 2023/0342893 | A1 * | 10/2023 | Hinz | G06T 5/60 |

FOREIGN PATENT DOCUMENTS

| | | | |
|---|---|---|---|
| WO | WO 2021099003 A1 | 5/2021 | |
| WO | WO 2022053431 A1 | 3/2022 | |

OTHER PUBLICATIONS

Liu et al., "Few-Shot Unsupervised Image-to-Image Translation", Cornell University Library, Computer Science, Computer Vision and Pattern Recognition, arXiv:1905.01723v2, Sep. 9, 2019, 20 pages.
Zhang et al., "Landmark Detection and 3D Face Reconstruction for Caricature using a Nonlinear Parametric Model", Cornell University Library, Computer Science, Computer Vision and Pattern Recognition, arXiv:2004.09190v1, Apr. 20, 2020, 12 pages.
Cao, Chen, "Real-time 3D Neural Facial Animation from Binocular Video (SIGGRAPH 2021)", YouTube Video Duration: 6:38, May 7, 2021, 3 pages.
Brennan, Susan, "Caricature Generator: The Dynamic Exaggeration of Faces by Computer", Leonardo, vol. 18, Issue No. 3, 1985, 10 pages.
Han et al., "Exemplar-Based 3D Portrait Stylization", Cornell University Library, Computer Science, Computer Vision and Pattern Recognition, ArXiv2104.14559v1, Apr. 29, 2021, 14 pages.
Gong et al., "SpiralNet++: A Fast and Highly Efficient Mesh Convolution Operator", Cornell University Library, Computer Science, Computer Vision and Pattern Recognition, arXiv:1911.05856v1, Nov. 13, 2019, 8 pages.
Cao et al., "Carigans: Unpaired Photo-to-Caricature Translation", Association for Computing Machinery (ACM), ACM Transactions on Graphics, vol. 37, Issue 6, Article No. 244, Dec. 4, 2018, 14 pages.
Blanz et al., "A Morphable Model for the Synthesis of 3D Faces", Association for Computing Machinery (ACM). SIGGRAPH '99: Proceedings of the 26th annual conference on Computer graphics and interactive techniques, Jul. 1999, 8 pages.
Nonis et al., "3D Approaches and Challenges in Facial Expression Recognition Algorithms—A Literature Review", MDPI Open Access Journals, Applied Sciences, vol. 9, Article 3904, Sep. 18, 2019, 33 pages.
Sela et al., "Computational caricaturization of surfaces", ScienceDirect, Computer Vision and Image Understandings, vol. 141, Dec. 2015, 17 pages.

* cited by examiner

R:

T:

METHOD AND AN APPARATUS FOR GENERATING A 3D FACE COMPRISING AT LEAST ONE DEFORMED REGION

CROSS REFERENCE TO RELATED APPLICATIONS

This application is a U.S. National Stage Application under 35 U.S.C. § 371 of International Patent Application No. PCT/EP2022/063202, filed May 16, 2022, which is incorporated herein by reference in its entirety.

This application claims priority to European Application No. 21305647.6, filed May 18, 2021, which is incorporated herein by reference in its entirety.

TECHNICAL FIELD

The present embodiments generally relate to a method and an apparatus for generating caricatures of 3D scanned faces.

BACKGROUND

Digital humans are elements of an entertainment digital world. The acquisition of one's face to make a digital character can be performed thanks to portable setup or mobile device. Such 3D faces to fit a specific scenario, game or application can be stylized using 3D caricaturing. Caricature can be defined as an art form that represents human faces in exaggerated, simplified or abstract ways. Caricaturing emphasizes the features that make a person unique, and thus creates an easily identifiable visual likeness. Human faces vary in size, shape, proportions, some have remarkably placed wrinkles and some have particular expressions. There are numerous ways to caricature a person's face, depending on the artist's style and choices. Caricature can be divided in several independent parts, e.g. exaggerating the shape of the head, the expressions, emphasizing facial lines or abstracting the haircut. Caricatures are mainly used to express sarcasm and humor for political and social issues, but they are also popular in many multimedia applications, such as entertainment, advertisements, electronic games, virtual and augmented reality (e.g. Nintendo® 'mii' avatar).

As a simplification and abstraction process, caricatures can be a solution to avoid the Uncanny Valley: the hypothesis that our empathy response toward a virtual character increases with its human likeness, but a feeling of eeriness appears when the human likeness is only near perfect. This unwanted effect appears in several domains such as robotics and virtual characters.

Existing methods for computer assisted caricature generation show lack of genericity by being limited to a single application or type of caricature. Therefore, there is a need to improve the state of the art.

SUMMARY

According to an embodiment, a method for generating a 3D face comprising at least one region deformed according to a deformation style is provided. The method comprises providing 3D data representative of at least one region of a first 3D face as input to a neural network-based geometry deformation generator, providing data representative of the deformation style as input to the neural network-based geometry deformation generator, obtaining from the neural network-based geometry deformation generator, the 3D face comprising the at least one deformed region wherein the at least one deformed region includes geometry deformations representative of the deformation style.

According to another embodiment, an apparatus for generating a 3D face comprising at least one region deformed according to a deformation style is provided. The apparatus comprises one or more processors configured for providing 3D data representative of at least one region of a first 3D face as input to a neural network-based geometry deformation generator, providing data representative of the deformation style as input to the neural network-based geometry deformation generator, obtaining from the neural network-based geometry deformation generator, the 3D face comprising the at least one deformed region wherein the at least one deformed region includes geometry deformations representative of the deformation style.

One or more embodiments also provide a computer program comprising instructions which when executed by one or more processors cause the one or more processors to perform the method for generating a 3D face according to any of the embodiments described above. One or more of the present embodiments also provide a computer readable storage medium having stored thereon instructions for generating a 3D face according to the methods described above.

DETAILED DESCRIPTION

Figure 1:
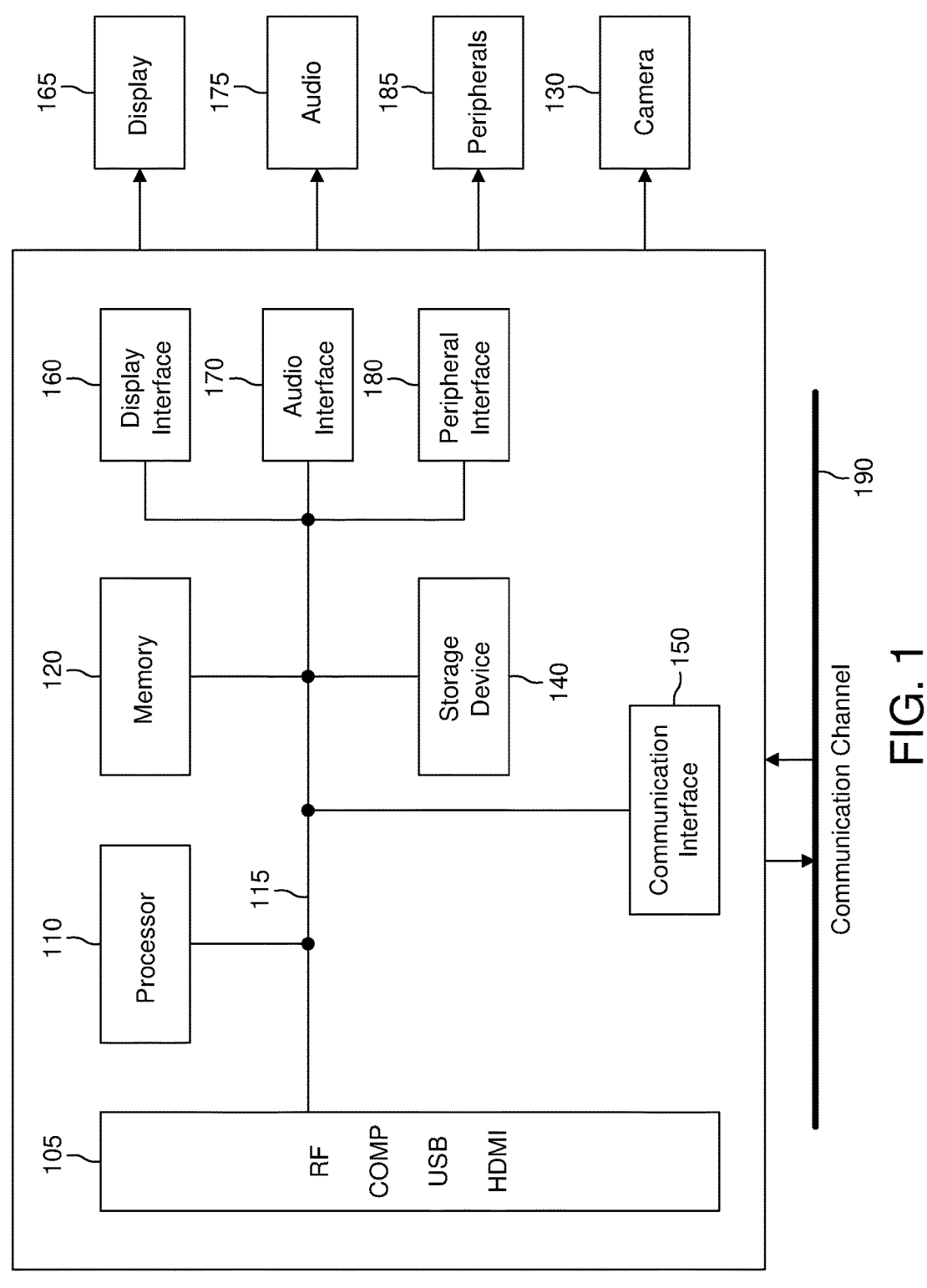
FIG. 1 illustrates a block diagram of an exemplary apparatus for generating a 3D face comprising at least one deformed region, according to an embodiment.

Computer-based methods for caricature generation can be divided in four families: rule-based methods, geometry processing methods, supervised data-driven methods and unsupervised data-driven methods.

Rule-based methods follow the rules of caricatures to generate deformed faces with emphasized features. A common rule is the "Exaggerating the Difference From the Mean" (EDFM) which consists in emphasizing the features that make a person unique, i.e different from the average face. Rule-based methods can generate a caricature from an input photograph or a 3D model, but fail at reproducing artistic styles. Different caricaturists will make different caricatures from a same person. To avoid this issue, these methods usually provide user interaction at a relatively low-level, which requires artistic knowledge/skills from the user. Therefore, with these kind of methods, a user without artistic skills cannot obtain satisfactory caricatures.

A rule-based method proposes an implementation of EDFM in two dimensions. EDFM stands for "Exaggerating the Difference From the Mean" which consists in emphasizing the features that make a person unique i.e. different from the average face. In this implementation, an interactive system is built where a user can select facial feature points which are matched against the average feature points, then the distance between them is exaggerated. In another example, a Principal Component Analysis model is learnt over 200 3D textured faces. The system allows caricature generation by increasing the distance to the statistical mean in terms of geometry and texture.

Geometry processing methods rely on intrinsic or extracted features of geometrical shapes. They generalize the concept of caricature beyond the domain of human faces, and they can caricature a 2D or 3D shape without any reference model. As they do not take into account any statistical information, neither the concept of artistic style, they try to link low-level geometry information to high-level caricatures concepts e.g. the fact that the most salient area should be more exaggerated. As a result, geometry processing methods fail at generating different artistic styles, in the same way rules-based methods do.

In another example, a geometry processing method is used in which a computational approach for surface caricaturizing is introduced by locally scaling the gradient field of a mesh by its absolute Gaussian curvature. A reference mesh can be provided to follow the EDFM rule, and the authors show that their method is invariant to isometries, i.e. invariant to poses.

Supervised data-driven methods are based on paired datasets which requires the work of 2D or 3D artists. These datasets are difficult to obtain, therefore this family of techniques is not suitable for mass market applications. For instance, a set of locally linear mappings is regressed from sparse exemplars of 3D faces and their corresponding 3D caricature. More specifically, they mapped the deformation gradients of a 3D normal face between its nearest neighbors to the deformation gradients of its corresponding 3D caricature between its nearest neighbors.

Unsupervised data-driven methods learn directly from in-the-wild caricatures, mostly relying on new deep learning techniques. They use style transfer architectures to learn 3D face to 3D caricature translation and 2D photo to 3D caricature translation from unpaired datasets. By abstracting the problem, these methods reproduce a style of artists, but a user has no way to interact on the method. An example of these methods proposed a photo to 2D caricature translation framework CariGANs based on two Generative Adversarial Nets (GAN), namely CariGeoGAN for geometry exaggeration using landmark warping, and CariStyGAN for stylization. In existing computer-based methods for caricaturing or deforming a 3D face, deep learning techniques are applied on 2D data to generate caricatures and then converted to 3D meshes. Some geometry processing methods enable fine user control on the output styled mesh, however such geometry processing methods cannot capture the style of a given caricatured mesh.

According to the principles presented herein, a system and a method that can automatically caricature a 3D face, i.e. directly using 3D data, is provided.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

Program code to be loaded onto processor 110 to perform the various aspects described in this application may be stored in storage device 140 and subsequently loaded onto memory 120 for execution by processor 110. In accordance with various embodiments, one or more of processor 110, memory 120, storage device 140, may store one or more of various items during the performance of the processes described in this application. Such stored items may include, but are not limited to, the input 3D face, the deformed 3D face or portions of the deformed 3D face, the 3D faces data sets, the 2D and/or 3D caricatures data set, matrices, variables, and intermediate or final results from the processing of equations, formulas, operations, and operational logic.

In several embodiments, memory inside of the processor 110 is used to store instructions and to provide working memory for processing that is needed during generating the deformed regions of the 3D face. In other embodiments, however, a memory external to the processing device (for example, the processing device may be either the processor) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal, (v) a camera 130 embedded in the system 100 or coupled to the system 100.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing. Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Geometry based methods cannot capture information about the caricature style of any artist. Supervised learning-based methods require a paired mesh-to-caricature dataset, and building such a large dataset is highly consuming in term of both time and means to achieve it.

Therefore, a system is provided that take advantage of new deep learning techniques to transfer the style of a 3D caricature to a 3D face. The network architecture is based on the shared content space assumption of Ming-Yu Liu, Xun Huang, Arun Mallya, Tero Karras, Timo Aila, Jaakko Lehtinen, and Jan Kautz. *Few-Shot Unsupervised Image-to-Image Translation.* arXiv:1905.01723 [cs, stat], September 2019, that is adapted to the context of 3D data using 3D convolutions.

The shared content space assumption assumes that the code space in which the style code and content code are defined is shared between the two representations. That is, the encoded space is the same whether an input mesh obtained from a real 3D face is encoded or a deformed mesh (caricatured mesh) is encoded.

Figure 2:
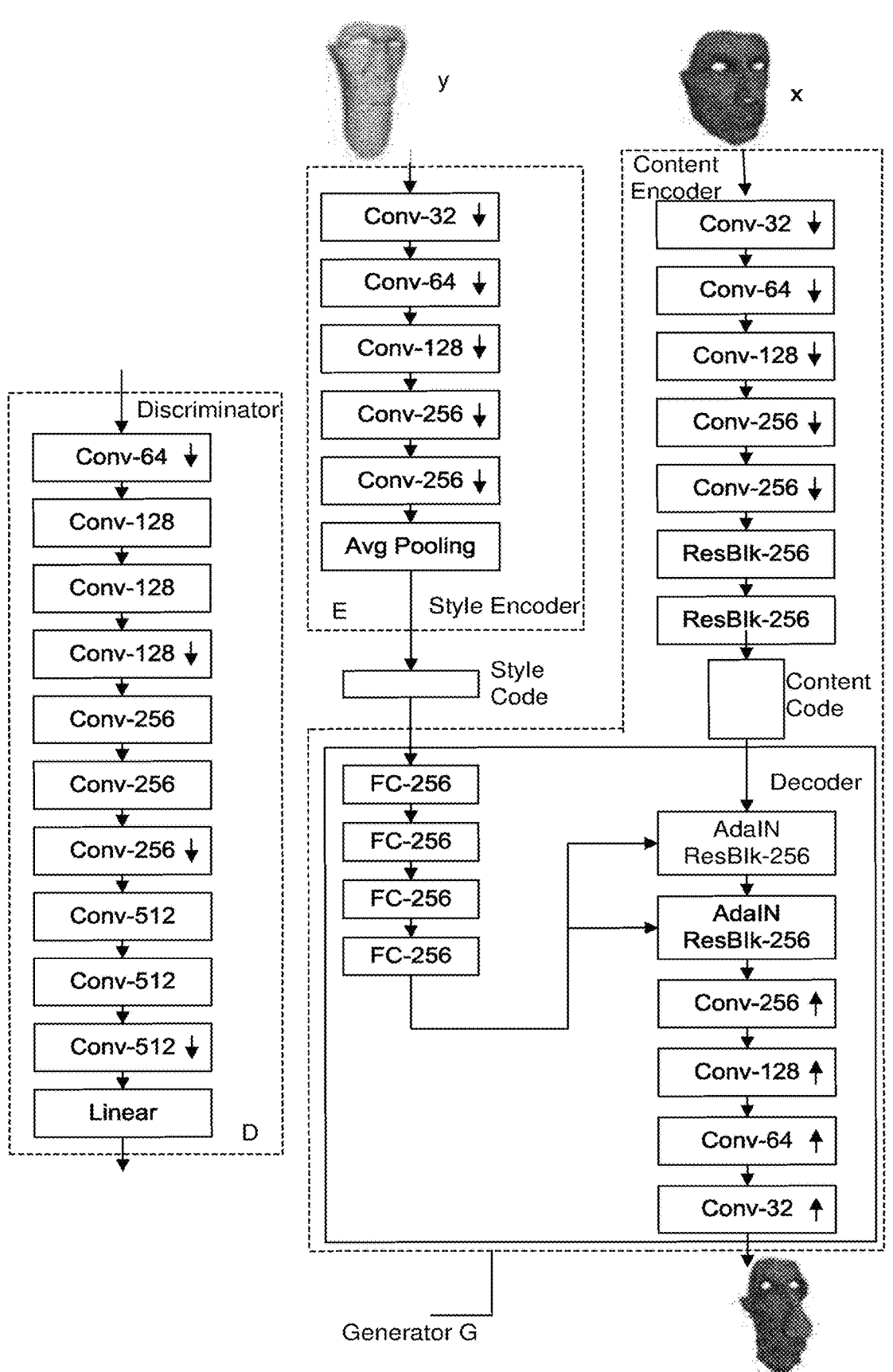
FIG. 2 illustrate an exemplary system for generating a 3D face comprising at least one deformed region, according to an embodiment.

Let x and y be two sets of meshes of different domains. They both share the same mesh topology. Given a mesh $x \in X$ and an arbitrary style $y \in Y$, according to the present principles, a single generator G is trained that can generate diverse meshes of each style y that corresponds to the mesh x. Style-specific style vectors are generated in a learned style space of each style and the generator G is trained to reflect the style vectors. FIG. 2 illustrates a example of the architecture of the framework, which consists of three modules described below. Note that the texture is not processed here, only the geometry.

The faces are represented with raw xyz coordinates, and encoded using a 3D convolutional operator described below. Their topology is fixed, each face having the same number of vertices, with the same connectivity.

The 3D convolutional operator is based on Shunwang Gong, Lei Chen, Michael Bronstein, and Stefanos Zafeiriou. SpiralNet++: *A Fast and Highly Efficient Mesh Convolution Operator. arXiv*:1911.05856 [cs], November 2019. arXiv: 1911.05856. The 3D convolutional operator uses a spiral path determined for each vertex of the 3D mesh that is provided as input to the neural network. The spiral path is determined in a pre-processing step and comprises a number of neighboring vertices of the vertex along a spiral. Also, pooling and downscaling are determined for the input 3D mesh to reduce the number of vertices. In the neural network, convolutional is applied on the vertex and its neighbors along by the spiral path.

The system illustrated on FIG. 2 comprises a neural-network based generator G which comprises a neural network-based content encoder and neural-network-based decoder. The system also comprises a style encoder E and a discriminator D.

Generator. The generator G translates an input mesh x into an output mesh G(x, s) reflecting a style-specific style code s, which is provided by the style encoder E. Adaptive instance normalization (AdaIN) is used to inject s into G. The style-specific style code s is designed to represent a style of a specific style y, which removes the necessity of providing y to G and allows G to synthesize meshes of all domains.

The generator takes an input mesh which is encoded as a latent content code by the neural-network based content encoder. The output content code is representative of the input mesh but it is style-invariant. In other words, the content encoder encodes the characteristics of the input 3D face without its original style.

An example of architecture of the content encoder is illustrated in FIG. 2 wherein the content encoder comprises 7 layers wherein Conv-NbF indicates a number of NbF convolution filters used in a layer followed by a pooling, ResBlk-NbF indicates a ResBlock function which has two convolution, the ResBlock function is of type f(x)=x+conv2 (conv1(x)), with conv1 having an activation elu, Instance normalization is applied to each layer.

The content code is provided as input to the neural-network-based decoder that applies the style-specific style code s to the content code and generated from the content code and the style code the output mesh presenting deformation reflecting the specific style of s while preserving the characteristic of the input mesh x.

An example of architecture of the decoder is illustrated in FIG. 2 wherein a first module of the decoder (upper part) comprises 6 layers with 2 layers of adaptive instance normalization and 4 convolutional layers wherein Conv-X indicates a number of X convolution filters used in a layer followed by an upscaling and activation layers elu. The second part of the decoder (bottom part) comprises 4 layers of fully connected layers (FC-256) having 256 filters each with activation layer relu.

Style encoder. Given a mesh x and its corresponding style y, the encoder E extracts the style codes Ey(x) of x. Here, Ey(•) denotes the output of E corresponding to the style y. The style encoder benefits from a multi-task learning setup. The style encoder E produces diverse style codes using different reference meshes. Each input style mesh is first map to an intermediate latent vector. These latent vectors are then element-wise averaged to produce a final style code. This allows the generator G to synthesize an output mesh reflecting the style of a reference mesh x.

An example of architecture of the style encoder is illustrated in FIG. 2 wherein the style encoder comprises 5 convolutional layers wherein Conv-NbF indicates a number of NbF convolution filters used in a layer followed by a pooling, and an average pooling layers to produce the final style code. Each convolution layer has also an activation layer elu.

Discriminator. The discriminator D is a multitask discriminator, which consists of multiple output branches. Each branch Dy learns a binary classification determining whether a mesh x is a real mesh of its style y or a fake mesh G(x, s) produced by G.

Figure 6:
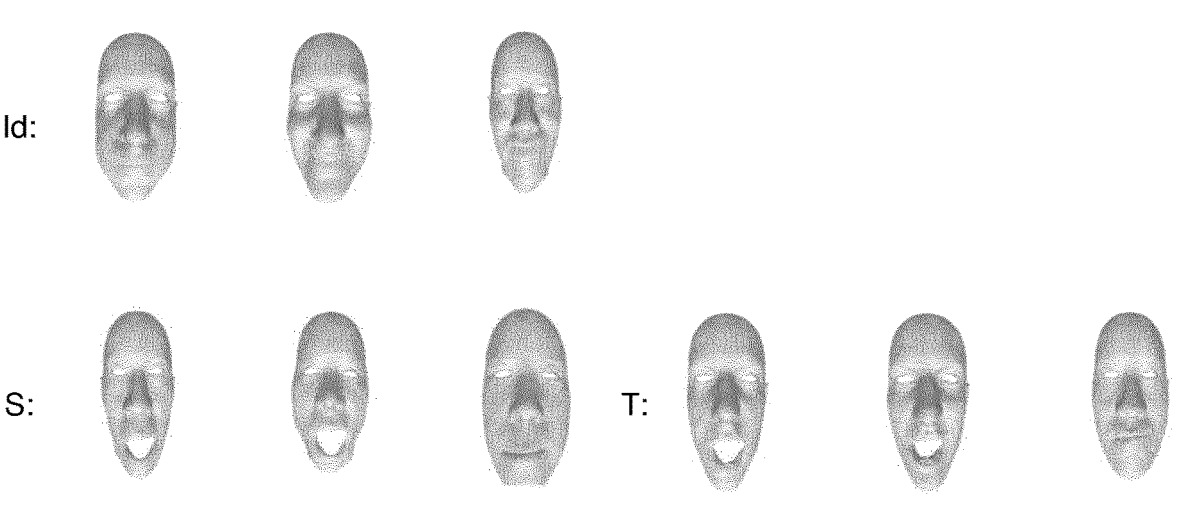
FIG. 6 illustrates examples of transfer of a style of 3D meshes to other 3D meshes, according to an embodiment.

An example of architecture of the discriminator is illustrated in FIG. 2 wherein the discriminator comprises 10 layers wherein Conv-NbF indicates a number of NbF convolution filters used in a layer followed by a pooling for layers showing a down arrow in FIG. 6, and a last linear layer. Each convolution layer has also an activation layer elu.

The neural-network content encoder, style encoder and decoder use 3D convolutions operators as described above, with spiral convolutions of size 9 and stride of 1.

The architecture illustrated on FIG. 2 is an example, other architectures for the neural-networks (number of layers, type of layers, etc. . . . ) are possible.

Training Objectives

Given a mesh $x \in X$ and its original style $y \in Y$, the framework is trained using the following objectives.

Adversarial Objective

During training, a mesh a is sampled and its style code s=E y (a) is generated. The generator G takes a mesh x and s as inputs and learns to generate an output mesh G(x,s) via an adversarial loss $L_{adv}$:

$$L_{adv} = E_{x,y}[\log D_y(x)] + E_{x,\tilde{y},z}[\log(1 - D_{\tilde{y}}(G(x, \tilde{s})))]$$

where D y (•) denotes the output of D corresponding to the style y. G learns to utilize s and generate a mesh G(x, s) that is indistinguishable from real meshes of the style y.

Reconstruction and Cycle Loss

To guarantee that the generated mesh G(x, s) properly preserves the style invariant characteristics (e.g. identity) of its input mesh x, a cycle consistency loss $L_{cyc}$ is employed:

$$L_{cyc} = E_{x,y,\tilde{y}}[\|x - G(G(x, \tilde{s}), \hat{s})\|^1]$$

where $\hat{s}=Ey(x)$ is the estimated style code of the input mesh x, $\tilde{y}$ is the style of another mesh than x, y is the original style of x and $\tilde{s}$ is the estimated style code of $\tilde{y}$. By encouraging the generator G to reconstruct the input mesh x with its estimated style code ŝ, G learns to preserve the original characteristics of x while changing its style faithfully.

In a similar goal of preserving style invariant characteristics, a reconstruction loss $L_r$ is used:

$$L_r = E_{x,y}\left[\|x - G(x, \hat{s})\|^1\right]$$

Where $\hat{s}=E_y$ (x) is the estimated style code of the input mesh x.

Full Objective

The full objective function can be summarized as follows:

$$\min_{G,E}\max_{D}(L_{adv} + \lambda_{cyc} \cdot L_{cyc} + \lambda_r \cdot L_r)$$

where $\lambda_r$ and $\lambda_{cyc}$ are hyper parameters for each term. Adam Optimizer are used to train the network framework.

Figure 3:
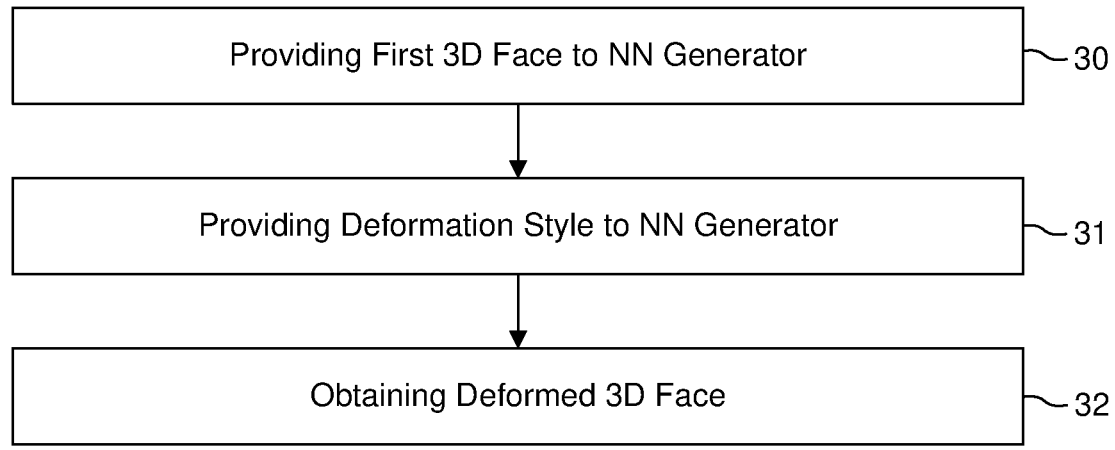
FIG. 3 illustrates a block diagram of an exemplary method for generating a 3D face comprising at least one deformed region according to an embodiment.

FIG. 3 illustrates a block diagram of an exemplary method for generating a 3D face comprising at least one deformed region according to a deformation style, according to an embodiment. The terms "deformation style" is used herein to distinguish between the original style of the input 3D mesh representative of a face and a style extracted from another 3D face mesh that is transferred to the input 3D mesh using the neural-network generator. The style extracted from the other 3D mesh is used for generating the output 3D mesh which is representative of the input 3D mesh deformed or modified using the extracted style.

The method of FIG. 3 can be implemented using the network architecture described above. At 30, 3D data representative of at least one region of a first 3D face is provided as input to the neural network-based geometry deformation generator. At 31, data representative of the deformation style is provided as input to the neural network-based geometry deformation generator. At 32, the 3D face comprising the at least one deformed region is obtained from the neural network-based geometry deformation generator, wherein the at least one deformed region includes geometry deformations representative of the deformation style.

In an embodiment, the data representative of the deformation style is obtained from a second 3D face. This embodiment allows to transfer the style of a second 3D face to the first 3D face, for instance for transferring face expressions to the first 3D face.

Figure 5:
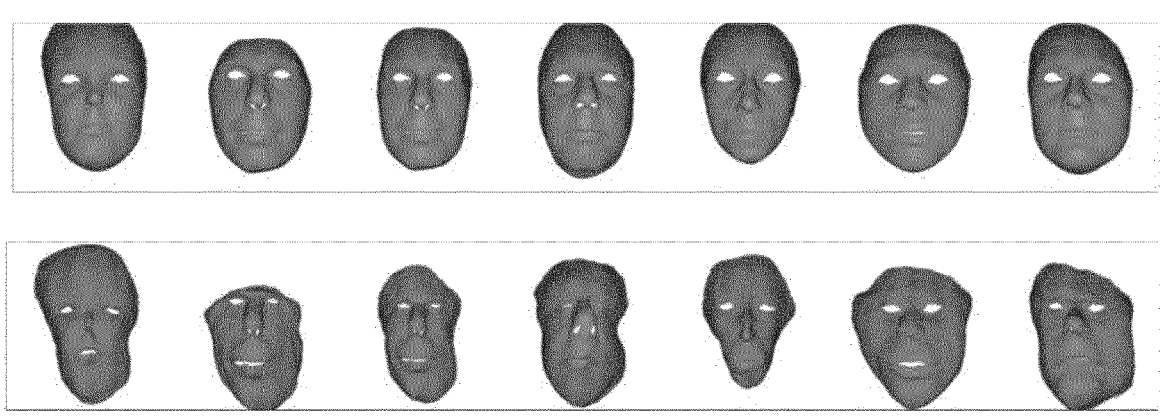
FIG. 5 illustrates examples of generated caricatures according to an embodiment.

FIG. 5 illustrates examples of generated caricatures according to an embodiment of the framework provided above. On FIG. 5, the first line shows individuals' face while the second line shows their caricatured version using the trained generator. Key features of the face are deformed: nose going up of the $4^{th}$ face, skinny shape of the $5^{th}$ face, big lips of the $5^{th}$ face, etc.

The network provided above is not limited to caricatures but can also be applied to facial expressions. The generator can be used to transfer the style of a 3D mesh to another mesh, for instance for transferring a facial expression to an input 3D mesh. FIG. 6 illustrates examples of such an embodiment. The line Id of FIG. 6 shows neutral faces, the line S shows others faces with expressions, and the line T shows the neutral faces (Id) to which the expressions of line S have been transferred using the network generator.

Figure 7:
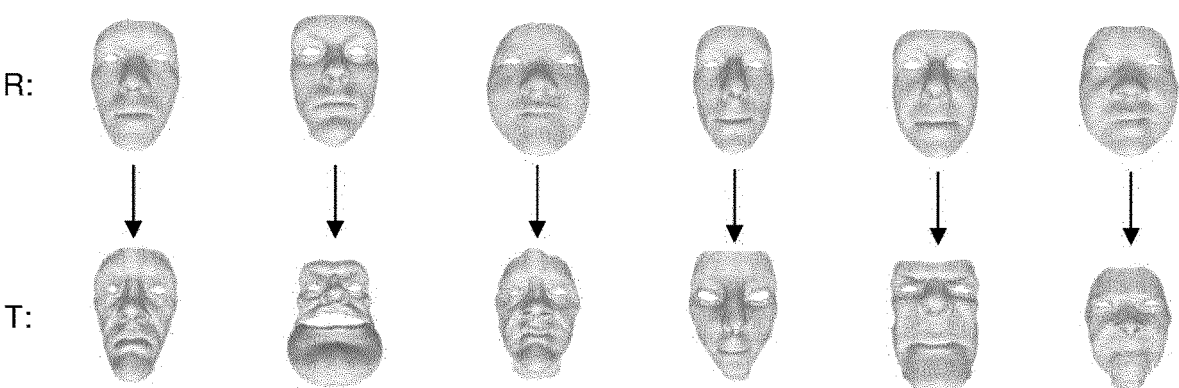
FIG. 7 illustrates other examples of transfer of a style of 3D meshes to other 3D meshes, according to an embodiment.

In a way similar to caricatures, monster or fantasy faces can be used as styles. FIG. 7 illustrates examples of results (line T of FIG. 7) of transferring some monster or fantasy styles to input faces (line R of FIG. 7) using the network generator.

Figure 4A:
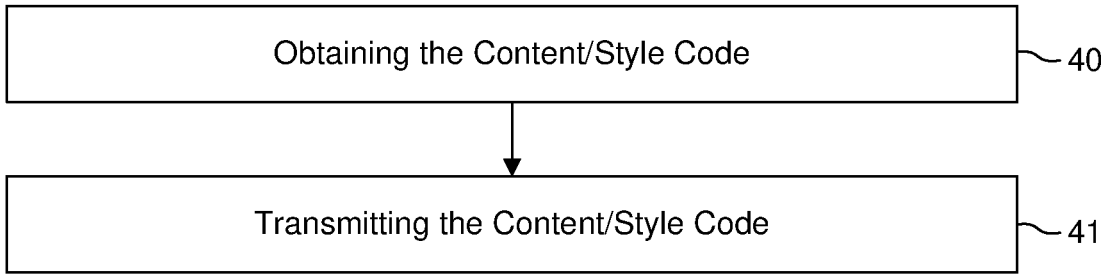
FIG. 4A illustrates a block diagram of an exemplary method for transmitting a content code and/or a style code, according to an embodiment.
Figure 4B:
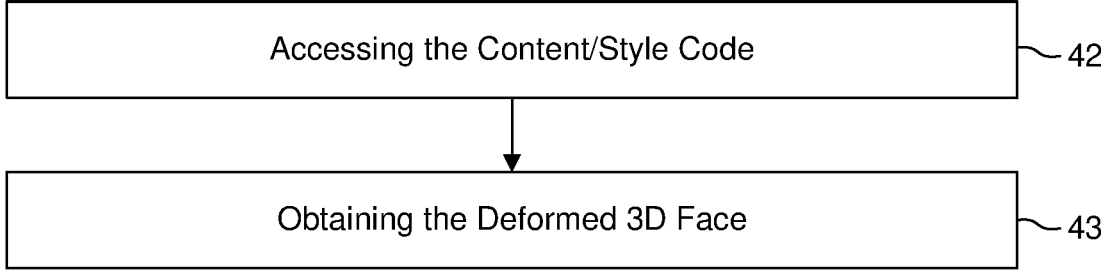
FIG. 4B illustrates a block diagram of an exemplary method for accessing a content code and/or a style code, according to an embodiment.

In an embodiment, the whole framework described above can be implemented in a single device. In other embodiments, one or more of the neural networks can be implemented in different devices, configured to communicate for transmitting/accessing the output/input data. FIG. 4A and FIG. 4B illustrates an example of an implementation where the content encoder, or the style encoder, or both is implemented in a different device as the decoder of the network generator.

FIG. 4A illustrates a block diagram of an exemplary method for transmitting a content code and/or a style code to a receiving device, according to this embodiment. At 40, the content code or the style code is obtained. For instance, the method is implemented by an emitting device that implements the content encoder of FIG. 2 and/or the style encoder of FIG. 2. The content encoder and/or the style encoder is obtained as an output of the content encoder or the style encoder as described above. At 41, the content code or the style code is embedded in a signal and transmitted to the receiving device. In a variant, the content code and the style code are obtained and transmitted in a same signal.

FIG. 4B illustrates a block diagram of an exemplary method for accessing a content code and/or a style code, according to an embodiment. At 42, the content code and/or the style code is accessed. For instance, the content code and/or the style code is received in a signal or retrieved from memory. At 43, the content code and the style code are provided to decoder of the generator. When the content code is not accessed at 42, an input mesh is provided as input to the content encoder configured to communicate with the decoder of the network generator. When the style code is not accessed at 42, a style mesh is provided as input to the style encoder configured to communicate with the decoder of the network generator. At 42, the deformed 3D face is obtained as an output of the decoder of the network generator.

Figure 8:
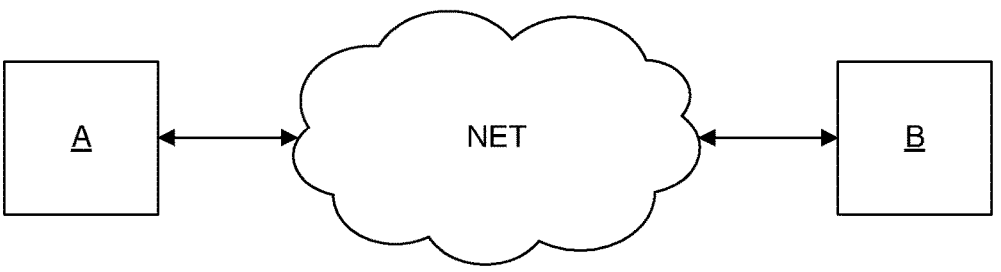
FIG. 8 shows two remote devices communicating over a communication network in accordance with an example of the present principles.

In an embodiment, illustrated in FIG. 8, in a transmission context between two remote devices A and B over a communication network NET, the device A comprises a processor in relation with memory RAM and ROM which are configured to implement a method transmitting a content code/style code as described with FIG. 4A and the device B comprises a processor in relation with memory RAM and ROM which are configured to implement a method for accessing a content code/style code as described in relation with FIG. 4B.

In accordance with an example, the network is a broadcast network, adapted to broadcast/transmit encoded data representative of a 3D face and/or a style mesh from device A to the device B.

A signal, intended to be transmitted by the device A, carries at least one bitstream comprising coded data representative of a 3D face and/or a style mesh. The bitstream may be generated from any embodiments of the present principles.

Figure 9:
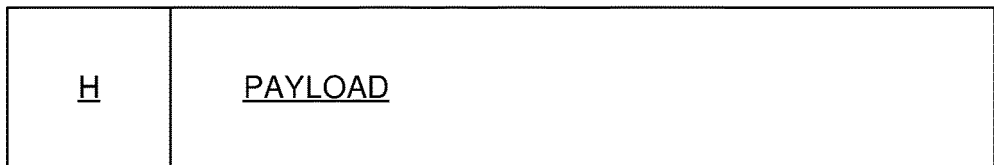
FIG. 9 shows the syntax of a signal in accordance with an example of the present principles.

FIG. 9 shows an example of the syntax of such a signal transmitted over a packet-based transmission protocol. Each transmitted packet P comprises a header H and a payload PAYLOAD. In some embodiments, the payload PAYLOAD may comprise coded data representative of a 3D face and/or a style mesh according to any one of the embodiments described above.

Various numeric values are used in the present application. The specific values are for example purposes and the aspects described are not limited to these specific values.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as is clear to one of ordinary skill in this and related arts, for as many items as are listed.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for generating a three-dimensional (3D) face comprising at least one region deformed according to a deformation style, comprising:
   providing 3D data representative of at least one region of a first 3D face as input to a neural network-based geometry deformation generator;
   providing a style code representative of the deformation style as input to the neural network-based geometry deformation generator; and
   obtaining from an output of the neural network-based geometry deformation generator, the 3D face comprising the at least one deformed region wherein the at least one deformed region includes geometry deformations representative of the deformation style.

2. The method of claim 1, wherein the style code is obtained as an output of a neural network-based style encoder taking as input 3D data representative of the deformation style.

3. The method of claim 2, further comprising transmitting the style code.

4. The method of claim 2, wherein at least one of a neural network-based content encoder of the neural network-based geometry deformation generator, a neural network-based decoder of the neural network-based geometry deformation generator or the neural network-based style encoder comprises a set of convolutional layers, and wherein at least one of the layers uses a 3D convolutional operator.

5. The method of claim 4, wherein the 3D convolutional operator is based on a spiral path determined for each vertex of the 3D mesh provided as input to the at least one layer, the spiral path comprising a number of neighboring vertices of the vertex to which a convolutional kernel is applied in the at least one layer.

6. The method of claim 1, wherein the style code is obtained from a second 3D face.

7. The method of claim 1, wherein the neural network-based geometry deformation generator comprises:
   a neural network-based content encoder taking as input the 3D data representative of the at least one region of the first 3D face and outputting a content code representative of the at least one region of the first 3D face that is style-invariant; and
   a neural network-based decoder taking as input the content code and the style code, the neural network-based decoder outputting the 3D face comprising the at least one region deformed with the deformation style.

8. The method of claim 7, further comprising transmitting the content code.

9. The method of claim 1, wherein the 3D data representative of the at least one region of the first 3D face or the 3D data representative of the deformation style is a 3D mesh.

10. The method of claim 9, wherein the neural network-based geometry deformation generator is trained using at least one of the following loss including combinations thereof:

an adversarial loss using a discriminator that provides a binary classification indicating whether the input 3D mesh of the first 3D face is real mesh having its corresponding style or a 3D mesh produced by the neural network-based geometry deformation generator;

a cycle consistency loss guaranteeing that the output of the neural network-based geometry deformation generator preserves a style invariant characteristic of the input 3D mesh of the first 3D face when applying a style deformation distinct from the style deformation of the input 3D mesh of the first 3D face; or a reconstruction loss preserving the style invariant characteristic of the input 3D mesh of the first 3D face when applying the style code obtained from a neural network-based style encoder using as input the 3D mesh of the first 3D face.

11. A non-transitory computer readable storage medium having stored thereon instructions for causing one or more processors to perform the method of claim 1.

12. An apparatus for generating a three-dimensional (3D) face comprising at least one region deformed according to a deformation style, comprising one or more processors configured for:

providing 3D data representative of at least one region of a first 3D face as input to a neural network-based geometry deformation generator;

providing a style code representative of the deformation style as input to the neural network-based geometry deformation generator; and obtaining from an output of the neural network-based geometry deformation generator, the 3D face comprising the at least one deformed region wherein the at least one deformed region includes geometry deformations representative of the deformation style.

13. The apparatus of claim 12, wherein the style code is obtained as an output of a neural network-based style encoder taking as input 3D data representative of the deformation style.

14. The apparatus of claim 13, wherein the neural network-based geometry deformation generator comprises:

a neural network-based content encoder taking as input the 3D data representative of the at least one region of the first 3D face and outputting a content code representative of the at least one region of the first 3D face that is style-invariant; and a neural network-based decoder taking as input the content and the style code, the neural network-based decoder outputting the 3D face comprising the at least one region deformed with the deformation style.

15. The apparatus of claim 14, wherein the one or more processors are further configured for transmitting the content code.

16. The apparatus of claim 14, wherein at least one of the neural network-based content encoder, the neural network-based decoder or the neural network-based style encoder comprises a set of convolutional layers, and wherein at least one of the layers uses a 3D convolutional operator.

17. The apparatus of claim 16, wherein the 3D convolutional operator is based on a spiral path determined for each vertex of the 3D mesh provided as input to the at least one layer, the spiral path comprising a number of neighboring vertices of the vertex to which a convolutional kernel is applied in the at least one layer.

18. The apparatus of claim 12, wherein the style code is obtained from a second 3D face.

19. The apparatus of claim 12, wherein the 3D data representative of the at least one region of the first 3D face or the 3D data representative of the deformation style is a 3D mesh.

20. The apparatus of claim 12, wherein the one or more processors are further configured for transmitting the style code.

* * * * *